United States Patent
Saito

(10) Patent No.: US 11,370,433 B1
(45) Date of Patent: Jun. 28, 2022

(54) VEHICLE TRAVEL CONTROL METHOD AND VEHICLE TRAVEL CONTROL APPARATUS

(71) Applicant: Nissan Motor Co., Ltd., Yokohama (JP)

(72) Inventor: Shinya Saito, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/609,493

(22) PCT Filed: May 15, 2019

(86) PCT No.: PCT/JP2019/019378
§ 371 (c)(1),
(2) Date: Nov. 8, 2021

(87) PCT Pub. No.: WO2020/230300
PCT Pub. Date: Nov. 19, 2020

(51) Int. Cl.
*B62D 6/00* (2006.01)
*B62D 11/00* (2006.01)
(Continued)

(52) U.S. Cl.
CPC .......... *B60W 30/16* (2013.01); *B60W 50/087* (2013.01); *B60W 2552/30* (2020.02);
(Continued)

(58) Field of Classification Search
CPC ............... B60W 30/16; B60W 50/087; B60W 2552/30; B60W 2554/4041; B60W 2710/20; B60W 2720/10; B60W 2754/30
See application file for complete search history.

(56) References Cited

U.S. PATENT DOCUMENTS

| 4,852,677 A * | 8/1989 | Okazaki | ............... G05D 1/0272 |
| | | | 180/169 |
| 5,083,256 A * | 1/1992 | Trovato | ............... G05D 1/0246 |
| | | | 700/56 |

(Continued)

FOREIGN PATENT DOCUMENTS

| JP | 2003-048450 A | 2/2003 |
| JP | 2008-024038 A | 2/2008 |

(Continued)

*Primary Examiner* — Mussa A Shaawat
(74) *Attorney, Agent, or Firm* — Young Basile Hanlon & MacFarlane, P.C.

(57) ABSTRACT

A travel control method includes using the vehicle to autonomously control a travel of the vehicle. The vehicle has an autonomous speed control function for autonomously controlling a traveling speed of the vehicle and an autonomous steering control function for autonomously controlling the steering of the vehicle. The autonomous speed control function includes a curved route speed control function for controlling the traveling speed of the vehicle at a set speed corresponding to the size of a curve of a travel route. The curved route speed control function can be set to ON/OFF. Each of the autonomous speed control function and the autonomous steering control function can be set to ON/OFF. When the autonomous speed control function and the autonomous steering control function are set to ON, the curved route speed control function is operated regardless of whether the curved route speed control function is set to ON or OFF.

7 Claims, 8 Drawing Sheets

(51) Int. Cl.
    *B62D 12/00* (2006.01)
    *B63G 8/20* (2006.01)
    *G05D 1/00* (2006.01)
    *G06F 17/00* (2019.01)
    *A01B 69/00* (2006.01)
    *B60W 30/16* (2020.01)
    *B60W 50/08* (2020.01)

(52) U.S. Cl.
    CPC . *B60W 2554/4041* (2020.02); *B60W 2710/20* (2013.01); *B60W 2720/10* (2013.01); *B60W 2754/30* (2020.02)

(56) References Cited

U.S. PATENT DOCUMENTS

| | | | | |
|---|---|---|---|---|
| 5,838,562 | A * | 11/1998 | Gudat | B60K 31/0008 318/587 |
| 6,173,222 | B1 * | 1/2001 | Seo | G05D 1/0246 701/28 |
| 7,925,415 | B2 * | 4/2011 | Kudo | B60W 30/16 318/587 |
| 2009/0037062 | A1 | 2/2009 | Lee et al. | |
| 2012/0083947 | A1 * | 4/2012 | Anderson | G08G 1/166 701/1 |
| 2016/0280267 | A1 * | 9/2016 | Lavoie | B62D 5/0409 |
| 2017/0038775 | A1 * | 2/2017 | Park | G05D 1/0088 |
| 2017/0235311 | A1 | 8/2017 | Sekijima | |
| 2018/0037223 | A1 * | 2/2018 | Goto | G08G 1/16 |
| 2018/0059674 | A1 | 3/2018 | Kunisa et al. | |
| 2018/0108254 | A1 * | 4/2018 | Camacho | B60W 30/16 |
| 2018/0297580 | A1 * | 10/2018 | Koh | B60W 20/11 |
| 2019/0202453 | A1 * | 7/2019 | Farooqi | B60W 50/0098 |
| 2019/0220030 | A1 * | 7/2019 | Ohmura | B60W 30/143 |
| 2019/0251373 | A1 * | 8/2019 | Lee | G06T 7/73 |
| 2020/0005645 | A1 * | 1/2020 | Wray | G08G 1/163 |
| 2020/0207372 | A1 * | 7/2020 | Akamatsu | G06V 20/588 |
| 2020/0218259 | A1 * | 7/2020 | Parchami | B60W 30/0956 |
| 2020/0241523 | A1 * | 7/2020 | Brandin | B60W 40/02 |
| 2020/0339134 | A1 * | 10/2020 | Pennala | B60W 50/0205 |
| 2020/0377087 | A1 * | 12/2020 | Chen | B60W 60/0015 |
| 2021/0276588 | A1 * | 9/2021 | Kabzan | B60W 60/00 |

FOREIGN PATENT DOCUMENTS

| | | |
|---|---|---|
| JP | 2009-166722 A | 7/2009 |
| JP | 2017-114194 A | 6/2017 |
| JP | 2017-144776 A | 8/2017 |

* cited by examiner

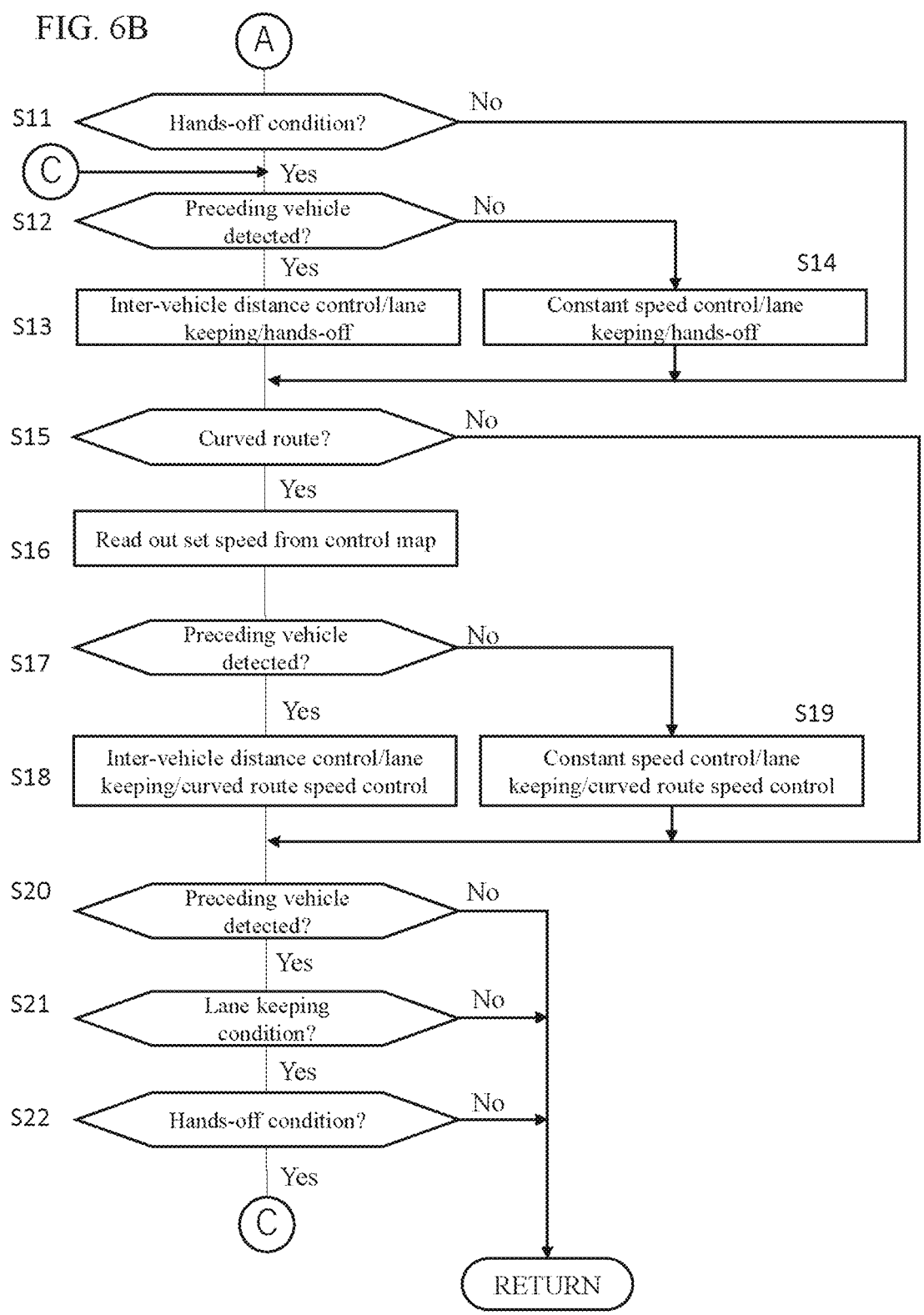

VEHICLE TRAVEL CONTROL METHOD AND VEHICLE TRAVEL CONTROL APPARATUS

TECHNICAL FIELD

The present invention relates to a travel control method and a travel control apparatus for a vehicle that include autonomous travel control.

BACKGROUND

A travel control apparatus that assists the steering of a vehicle is known, which corrects the vehicle speed so that the set speed when the driver travels along a curve without holding the steering wheel is lower than the set speed when the driver travels along the curve while holding the steering wheel, thereby eliminating anxiety in the travel sense (JP2017-144776A).

SUMMARY

According to the above prior art, however, when entering a curved route, the set speed is corrected after determining whether or not the driver holds the steering wheel, and the determination process therefore becomes complicated, which may be problematic.

A problem to be solved by the present invention is to provide a travel control method and a travel control apparatus for a vehicle with which the vehicle traveling speed along a curved route can be set with a simple determination process.

The present invention solves the above problem as follows in a travel control method for a vehicle. The travel control method includes using the vehicle to autonomously control a travel of the vehicle. The vehicle has an autonomous speed control function for autonomously controlling the traveling speed of the vehicle and an autonomous steering control function for autonomously controlling the steering of the vehicle. The autonomous speed control function includes a curved route speed control function for controlling the traveling speed of the vehicle at a set speed corresponding to the radius of curvature of a travel route. In the travel control method, when the autonomous speed control function and the autonomous steering control function are set to ON, the curved route speed control function is operated regardless of whether the curved route speed control function is set to ON or OFF.

According to the present invention, provided that the autonomous steering control function is set to ON, the curved route speed control function is operated even when the curved route speed control function is set to OFF, and the vehicle traveling speed along a curved route can therefore be set with a simple determination.

BRIEF DESCRIPTION OF THE DRAWINGS

FIG. 6B is a flowchart (part 2) illustrating the travel control process of the travel control apparatus for a vehicle according to the present invention.

DETAILED DESCRIPTION

Figure 1:
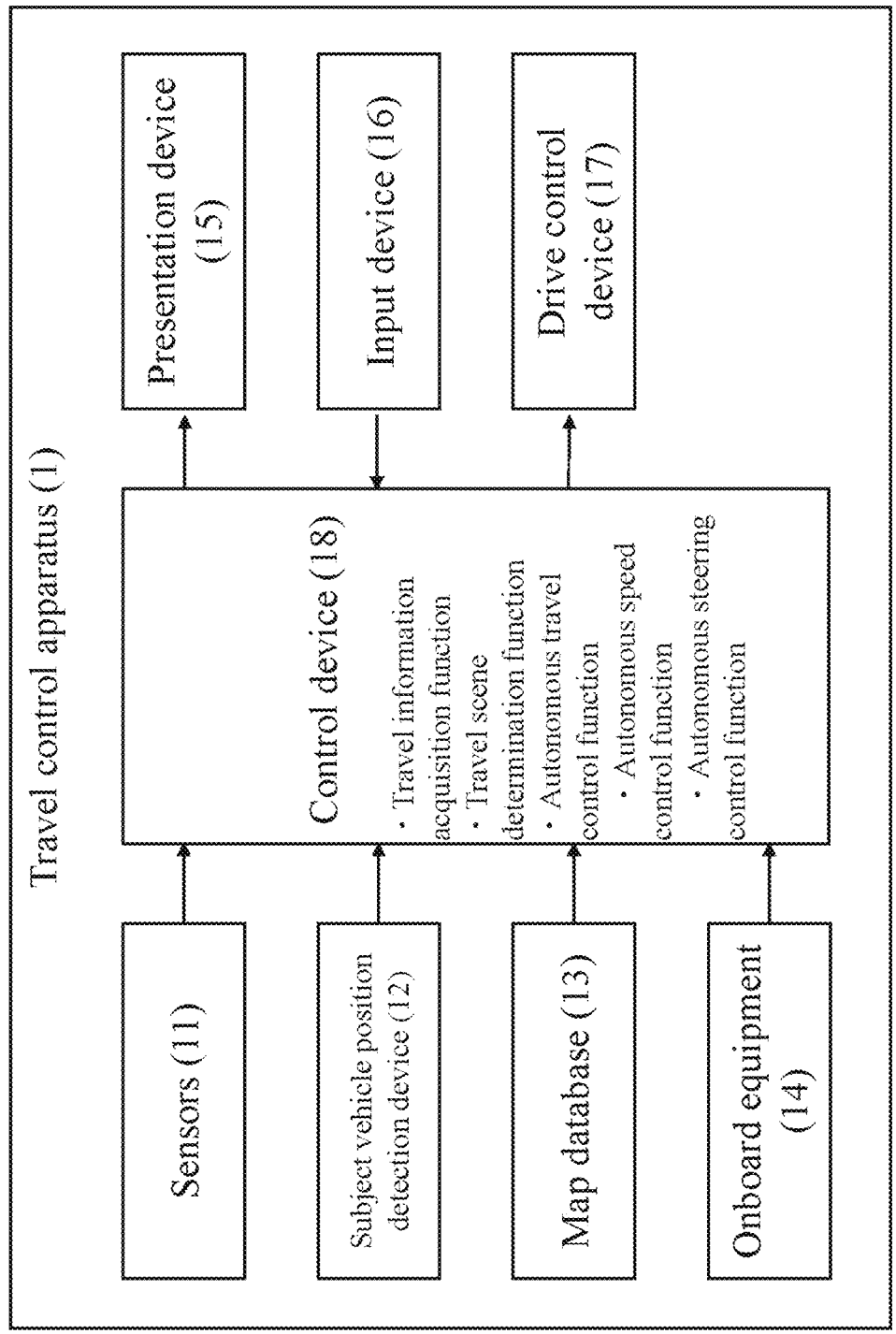
FIG. 1 is a block diagram illustrating an embodiment of the travel control apparatus for a vehicle according to the present invention.

FIG. 1 is a block diagram illustrating the configuration of a travel control apparatus 1 for a vehicle according to an embodiment of the present invention. The travel control apparatus 1 for a vehicle according to the present embodiment represents an embodiment for carrying out the travel control method for a vehicle according to the present invention. As illustrated in FIG. 1, the travel control apparatus 1 for a vehicle according to the present embodiment includes sensors 11, a subject vehicle position detection device 12, a map database 13, onboard equipment 14, a presentation device 15, an input device 16, a drive control device 17, and a control device 18. These devices are connected to one another, for example, via a controller area network (CAN) or other onboard LAN for mutually exchanging information.

The sensors 11 detect a traveling state of a subject vehicle. Examples of the sensors 11 include, for example, a front camera that captures images ahead of the subject vehicle, a rear camera that captures images behind the subject vehicle, a front radar that detects obstacles ahead of the subject vehicle, a rear radar that detects obstacles behind the subject vehicle, side radars that detect obstacles existing on the right and left sides of the subject vehicle, a vehicle speed sensor that detects the vehicle speed of the subject vehicle, a touch sensor (capacitance sensor) that detects whether or not the driver holds the steering wheel, an onboard camera that captures images of the driver, etc. The sensors 11 may be represented by one of the above-described various sensors or may also be configured as a combination of two or more sensors. The detection results of the sensors 11 are output to the control device 18 at predetermined time intervals.

The subject vehicle position detection device 12 is composed of a GPS unit, a gyro-sensor, a vehicle speed sensor, etc. The subject vehicle position detection device 12 detects radio waves transmitted from a plurality of communication satellites using the GPS unit to periodically acquire the positional information of a target vehicle (subject vehicle) and detects the current position of the target vehicle based on the acquired positional information of the target vehicle, angle variation information acquired from the gyro-sensor, and the vehicle speed acquired from the vehicle speed sensor. The positional information of the target vehicle detected by the subject vehicle position detection device 12 is output to the control device 18 at predetermined time intervals.

The map database 13 is a memory that stores three-dimensional high-precision map information including positional information of various facilities and specific points and is accessible from the control device 18. The three-dimensional high-precision map information stored in the map database 13 is three-dimensional map information based on the road shape detected when traveling on an actual road using a vehicle for data acquisition, and in the three-dimensional map information, detailed and highly precise positional information items, such as a curved route and the size of the curve (e.g., curvature or radius of curvature), a merging point and a branching point of a road, a tollgate, a position at which the number of lanes is reduced, and a service area/parking area, are associated with the map information as the three-dimensional information.

The onboard equipment 14 includes various modules equipped in the vehicle and is operated by the driver's operation. Examples of such onboard equipment include a steering wheel, an accelerator pedal, a brake pedal, a navigation device, direction indicators, wipers, lights, a horn, and other specific switches. When the driver operates the onboard equipment 14, its operation information is output to the control device 18.

The presentation device 15 is represented, for example, by devices such as a display of a navigation device, a display incorporated in a rearview mirror, a display incorporated in a meter unit, a head-up display projected on a windshield, a speaker of an audio device, and a seat device with embedded vibrating bodies. The presentation device 15 informs the driver of presentation information and lane change information, which will be described later, under the control by the control device 18.

Figure 2:
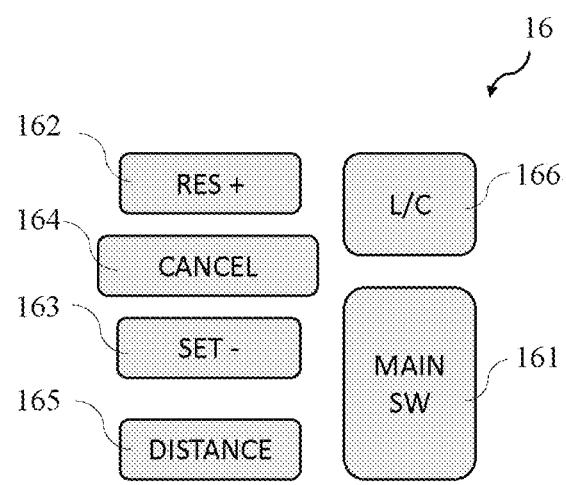
FIG. 2 is a front view illustrating a part of the input device of FIG. 1.

The input device 16 is, for example, a device such as a button switch or a touch panel disposed on a display screen with which the driver can input information by the manual operation or a microphone with which the driver can input information by the voice. In the present embodiment, the driver can operate the input device 16 thereby to input setting information in response to the presentation information which is presented by the presentation device 15. FIG. 2 is a front view illustrating a part of the input device 16 of the present embodiment and represents an example including a set of button switches arranged on a spoke part or the like of the steering wheel. The illustrated input device 16 includes button switches used when setting ON/OFF of an autonomous speed control function and an autonomous steering control function of the control device 18, and the button switches include a main switch (MAIN SW) 161, a resume/acceleration switch (RES+) 162, a set/coast switch (SET−) 163, a cancel switch (CANCEL) 164, an inter-vehicle distance adjustment switch (DISTANCE) 165, and a lane change assist switch (L/C) 166.

The main switch 161 is a switch for turning ON/OFF the power source of the system which achieves the autonomous speed control function and autonomous steering control function of the control device 18. The resume/acceleration switch 162 is a switch for turning OFF the operation of the autonomous speed control function and then resuming the autonomous speed control function at the set speed before the OFF state, for increasing the set speed, and/or for following a preceding vehicle to stop and then restarting. The set/coast switch 163 is a switch for starting the autonomous speed control function at the speed when traveling and/or lowering the set speed. The cancel switch 164 is a switch for turning OFF the autonomous speed control function. The inter-vehicle distance adjustment switch 165 is a switch for setting the inter-vehicle distance from a preceding vehicle and is, for example, a switch for selecting one from a plurality of stages of settings such as short distance/ medium distance/long distance. The lane change assist switch 166 is a switch for instructing (accepting) the start of a lane change when the control device 18 confirms the start of the lane change with the driver.

Additionally or alternatively to the set of button switches illustrated in FIG. 2, switches of the direction indicators or other onboard equipment 14 can also be used as the input device 16, and a configuration can be adopted in which the driver turns on the switch of the direction indicators in response to an inquiry from the control device 18 as to whether or not to perform a lane change in an automated or autonomous manner and inputs the acceptance or permission for the lane change. The setting information input with the input device 16 is output to the control device 18.

The drive control device 17 controls travel of the subject vehicle. For example, when the subject vehicle travels at a constant set speed or travels to follow a preceding vehicle using the autonomous speed control function, the drive control device 17 controls the operation of the drive mechanism (including the operation of an internal-combustion engine in the case of an engine car or the operation of an electric motor for travel in the case of an electric car and also including the torque distribution for an internal-combustion engine and an electric motor for travel in the case of a hybrid car) and the brake operation for achieving the acceleration/ deceleration and the traveling speed so that the speed of the subject vehicle becomes the set speed or, when there is a preceding vehicle, the inter-vehicle distance between the subject vehicle and the preceding vehicle becomes a constant distance. Additionally or alternatively, when the autonomous steering control function is used to perform the lane keeping control for detecting lane markers of a lane in which the subject vehicle travels (also referred to as a subject vehicle lane, hereinafter) and controlling the traveling position of the subject vehicle in the road width direction so that the subject vehicle travels, for example, at the center in the subject vehicle lane, or when a lane change assist function, an overtaking assist function, or a route traveling assist function is used for the subject vehicle to perform automated lane change control such as overtaking of a preceding vehicle or a change of the traveling direction, or when a right or left turn assist function is used to perform travel control for turning right or left at an intersection or the like, the steering control of the subject vehicle is executed by controlling the operation of the steering actuator in addition to the operation of the drive mechanism and the brake operation for achieving the acceleration/deceleration and the traveling speed. The drive control device 17 controls the travel of the subject vehicle in accordance with instructions from the control device 18, which will be described below. Any of other known methods can also be used as the travel control method executed by the drive control device 17.

The control device 18 is composed of a read only memory (ROM) that stores programs for controlling the travel of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as the operation circuit.

The control device 18 executes the programs stored in the ROM using the CPU thereby to achieve a travel information acquisition function for acquiring information regarding a traveling state of the subject vehicle, a travel scene determination function for determining a travel scene of the subject vehicle, and an autonomous travel control function for autonomously controlling the traveling speed and/or steering of the subject vehicle (the autonomous travel control function includes an autonomous speed control function for autonomously controlling the traveling speed of the subject vehicle and an autonomous steering control function for autonomously controlling the steering of the subject vehicle).

The travel information acquisition function of the control device 18 is a function used for acquiring the travel information regarding the traveling state of the subject vehicle. For example, the control device 18 uses the travel information acquisition function to acquire as the travel information the external image information around the vehicle captured by the front camera and rear camera included in the sensors 11 and/or the detection results by the front radar, rear radar, and side radars included in the sensors 11. Additionally or alternatively, the control device 18 uses the travel information acquisition function to acquire as the travel information the vehicle speed information of the subject vehicle detected by the vehicle speed sensor included in the sensors 11 and/or the image information of the driver's face captured by the onboard camera included in the sensors 11.

Additionally or alternatively, the control device 18 uses the travel information acquisition function to acquire as the travel information the current positional information of the subject vehicle from the subject vehicle position detection device 12. Additionally or alternatively, the control device 18 uses the travel information acquisition function to acquire as the travel information the positional information of curved routes and the size of the curve (e.g., curvature or radius of curvature), merging points, branching points, tollgates, positions at which the number of lanes decreases, service areas (SAs)/parking areas (PAs), etc. from the map database 13. In addition, the control device 18 uses the travel information acquisition function to acquire as the travel information the information on an operation of the onboard equipment 14 performed by the driver from the onboard equipment 14.

The travel scene determination function of the control device 18 is a function for referring to a table stored in the ROM of the control device 18 to determine a travel scene in which the subject vehicle is traveling. In the table stored in the ROM of the control device 18, for example, a travel scene suitable for changing lanes or overtaking and determination conditions thereof are stored for each travel scene. The control device 18 uses the travel scene determination function to refer to the table stored in the ROM and determine whether or not the travel scene of the subject vehicle is a travel scene suitable for, for example, changing lanes or overtaking.

It is assumed, for example, that four conditions of "there is a preceding vehicle ahead," "the vehicle speed of the preceding vehicle<the set vehicle speed of the subject vehicle," "the arrival at the preceding vehicle is within a predetermined time," and "the direction of lane change is not a lane change prohibition condition" are set as the determination conditions for a "scene of catching up with the preceding vehicle." In this case, the control device 18 uses the travel scene determination function to determine whether or not the subject vehicle satisfies the above conditions, for example, based on the detection results by the front camera and/or the front radar included in the sensors 11, the vehicle speed of the subject vehicle detected by the vehicle speed sensor, and the positional information of the subject vehicle obtained by the subject vehicle position detection device 12 and, when the above conditions are satisfied, determines that the subject vehicle is in the "scene of catching up with the preceding vehicle."

The autonomous travel control function of the control device 18 is a function used for autonomously controlling the travel of the subject vehicle without depending on the driver's operation and includes an autonomous speed control function used for autonomously controlling the traveling speed of the subject vehicle and an autonomous steering control function used for autonomously controlling the steering of the subject vehicle. The autonomous speed control function and autonomous steering control function of the present embodiment will be described below.

«Autonomous Speed Control Function»

The autonomous speed control function is a function used, when detecting a preceding vehicle, for traveling to follow the preceding vehicle while performing the inter-vehicle distance control so as to maintain the inter-vehicle distance in accordance with the vehicle speed with an upper limit of the vehicle speed that is set by the driver. The autonomous speed control function is also a function used, when detecting no preceding vehicle, for performing constant speed traveling at a vehicle speed that is set by the driver. The former is also referred to as inter-vehicle distance control while the latter is also referred to as constant speed control. The autonomous speed control function may include a function used, when detecting the speed limit of a travel lane using the travel information acquisition function, for automatically adopting the speed of the speed limit sign as a set vehicle speed.

To activate the autonomous speed control function, the driver first operates the resume/acceleration switch 162 or set/coast switch 163 of the input device 16 illustrated in FIG. 2 to input a desired traveling speed. For example, when the set/coast switch 163 is pressed while the subject vehicle is traveling at 70 km/h, the current traveling speed is set without any modification, but if the speed desired by the driver is 80 km/h, the resume/acceleration switch 162 may be pressed a plurality of times to increase the set speed. On the contrary, if the speed desired by the driver is 60 km/h, the set/coast switch 163 may be pressed a plurality of times to decrease the set speed. The inter-vehicle distance desired by the driver may be selected, for example, from a plurality of stages of settings such as short distance/medium distance/long distance by operating the inter-vehicle distance adjustment switch 165 of the input device 16 illustrated in FIG. 2.

In the constant speed control, the drive control device 17 controls the operation of the drive mechanism such as the engine and the brake while feeding back the vehicle speed data obtained by the vehicle speed sensor so as to maintain the traveling speed which is set by the driver. This constant speed control is executed while using the sensors 11 such as the front radar, which detects an obstacle ahead of the subject vehicle, to detect that there is no preceding vehicle ahead of the subject vehicle in its travel lane.

In the inter-vehicle distance control, the drive control device 17 controls the operation of the drive mechanism such as the engine and the brake while feeding back the inter-vehicle distance data detected by the sensors 11 (front radar) so as to maintain the inter-vehicle distance, which is set by the driver, with an upper limit of the traveling speed that is set by the driver. This inter-vehicle distance control is executed while using the sensors 11 such as the front radar, which detects an obstacle ahead of the subject vehicle, to detect that there is a preceding vehicle ahead of the subject vehicle in its travel lane and detect the inter-vehicle distance (the preceding vehicle in this case is a vehicle located just ahead of the subject vehicle). If the preceding vehicle stops while the subject vehicle is traveling under the inter-vehicle distance control, the subject vehicle also stops following the preceding vehicle, and if the preceding vehicle starts within 30 seconds after the subject vehicle stops, the subject vehicle also starts traveling to follow the preceding vehicle again by the inter-vehicle distance control. If the subject vehicle stops for more than 30 seconds, the subject vehicle does not start in an automated or autonomous manner even when the preceding vehicle starts, and after the preceding vehicle starts, the subject vehicle starts traveling to follow the preceding vehicle again by the inter-vehicle distance control when the resume/acceleration switch 162 is pressed or the accelerator pedal is depressed.

Figure 3:
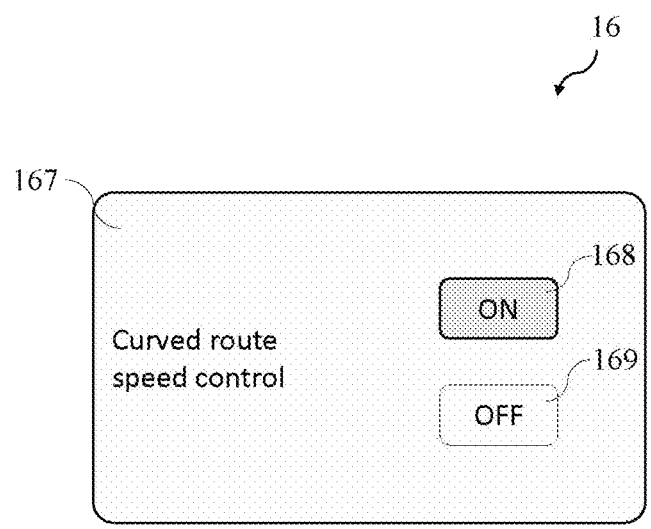
FIG. 3 is a front view illustrating another part of the input device of FIG. 1.
Figure 4:
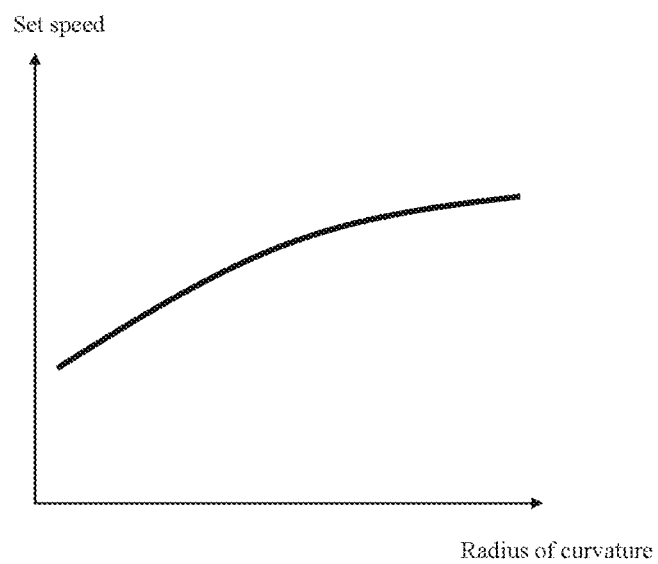
FIG. 4 is a control map illustrating a set speed with respect to the radius of curvature of a curved route stored in the control device of FIG. 1.

The autonomous speed control function of the present embodiment includes, in addition to the above-described constant speed control and inter-vehicle distance control, a curved route speed control function used for controlling the speed so as to be able to travel at a speed corresponding to the size of a curve (such as a curvature or radius of curvature of the curve) when traveling along a curved route. This curved route speed control function is a function for controlling the speed when traveling along a curved route only in the case in which the autonomous speed control function is operating. FIG. 3 is a front view illustrating another part of the input device 16, and FIG. 4 is a control map illustrating a set speed with respect to the radius of curvature of a curved route stored in the control device 18. The curved route speed control function of the present embodiment can be preliminarily set to ON/OFF as to whether or not to operate the function. As illustrated in FIG. 3, for example, one display screen 167 of the display of the navigation device can be used to input the setting with either an ON button 168 or an OFF button 169.

When the setting is input with the ON button 168 on the display screen 167, the curved route speed control function of the present embodiment is effectively activated, and the ON state of the curved route speed control function is held unless the setting is input with the OFF button 169 or the setting system is initialized. On the contrary, when the setting is input with the OFF button 169 on the display screen 167, the curved route speed control function of the present embodiment is disabled, and the OFF state of the curved route speed control function is held unless the setting is input with the ON button 168. Although not particularly limited, it is assumed that the setting of the curved route speed control function in the initial state is ON.

The curved route speed control function of the present embodiment is a function used for controlling the speed of the subject vehicle so that when a curved route is detected ahead of the subject vehicle, the subject vehicle can travel at a speed corresponding to the size of the curve, and the subject vehicle travels at a speed extracted from a control map that is preliminarily prepared rather than at a speed set by the driver for the autonomous speed control. For example, if the speed set by the driver is as high as 80 km/h, the travel along a sharp curve will cause anxiety or uncomfortable feeling as the travel sense, so the speed of the vehicle is set, for example, as low as 70 km while traveling along a curved route. That is, when the traveling speed set by the driver exceeds the set speed extracted from the control map illustrated in FIG. 4, the traveling speed of the vehicle is controlled with an upper limit of the set speed extracted from the control map.

Whether or not there is a curved route ahead of the subject vehicle is detected in such a manner that, for example, when a destination is input to the navigation device and a route to the destination is set, a determination is made with reference to the map database 13 as to whether or not there is map data as a curved route on the route. As for the size of the curve, data on the curvature or radius of curvature of the curve is extracted from the map database 13, and this data is input to the control map illustrated in FIG. 4 to extract the traveling speed when traveling along the curved route. As described above, when the radius of curvature of the curved route becomes small, the centrifugal force (lateral G) acting on the vehicle becomes large, which may cause anxiety or uncomfortable feeling as the travel sense; therefore, in the present embodiment, as illustrated in FIG. 4, the set speed of the vehicle is lowered as the radius of curvature of the curved route decreases.

The curved route speed control function of the present embodiment is enabled or disabled in accordance with the ON/OFF setting on the display screen 167 illustrated in FIG. 3, but two exceptions are set. First, even in a case in which the curved route speed control function is set to OFF on the display screen 167 illustrated in FIG. 3, when the autonomous speed control (inter-vehicle distance control or constant speed control) is executed and the autonomous steering control, which will be described later, is executed, the curved route speed control function is activated by the software of the control device 18. This is because when the autonomous steering control is performed to travel along a sharp curve or the like and the traveling speed set by the driver is high, the autonomous traveling may have to be suspended due to uncompleted turn.

The second exception is that even in a case in which the curved route speed control function is set to ON on the display screen 167 illustrated in FIG. 3, when the setting of the autonomous steering control function is OFF and the inter-vehicle distance control of the autonomous speed control function is used for traveling to follow a preceding vehicle, the curved route speed control function is deactivated (disabled). This is because the vehicle is following the preceding vehicle in accordance with the driver's steering wheel operation, so it is possible to turn a curve without anxiety or uncomfortable feeling even when the curved route speed control function is not activated to decrease the speed.

«Autonomous Steering Control Function»

The autonomous steering control function is a function used for controlling the operation of the steering actuator thereby to execute the steering control of the subject vehicle. This autonomous steering control function includes: a lane keeping function (lane width direction maintenance function) in which the steering is controlled so as to travel, for example, near the center of the lane to assist the driver's steering operation; a lane change assist function in which when the driver operates the blinker lever, the steering is controlled to assist the steering wheel operation necessary for changing lanes; an overtaking assist function in which when a vehicle slower than the set vehicle speed is detected ahead, a display is used for confirmation by the driver as to whether to perform an overtaking operation, and when the driver operates an acceptance switch, the steering is controlled to assist the overtaking operation; a route traveling assist function in which when the driver inputs the destination to the navigation device or the like and arrives at a lane change point required to travel along the route, a display is used for confirmation by the driver as to whether to perform a lane change, and when the driver operates an acceptance switch, the steering is controlled to assist the lane change; and other functions.

Figure 5:
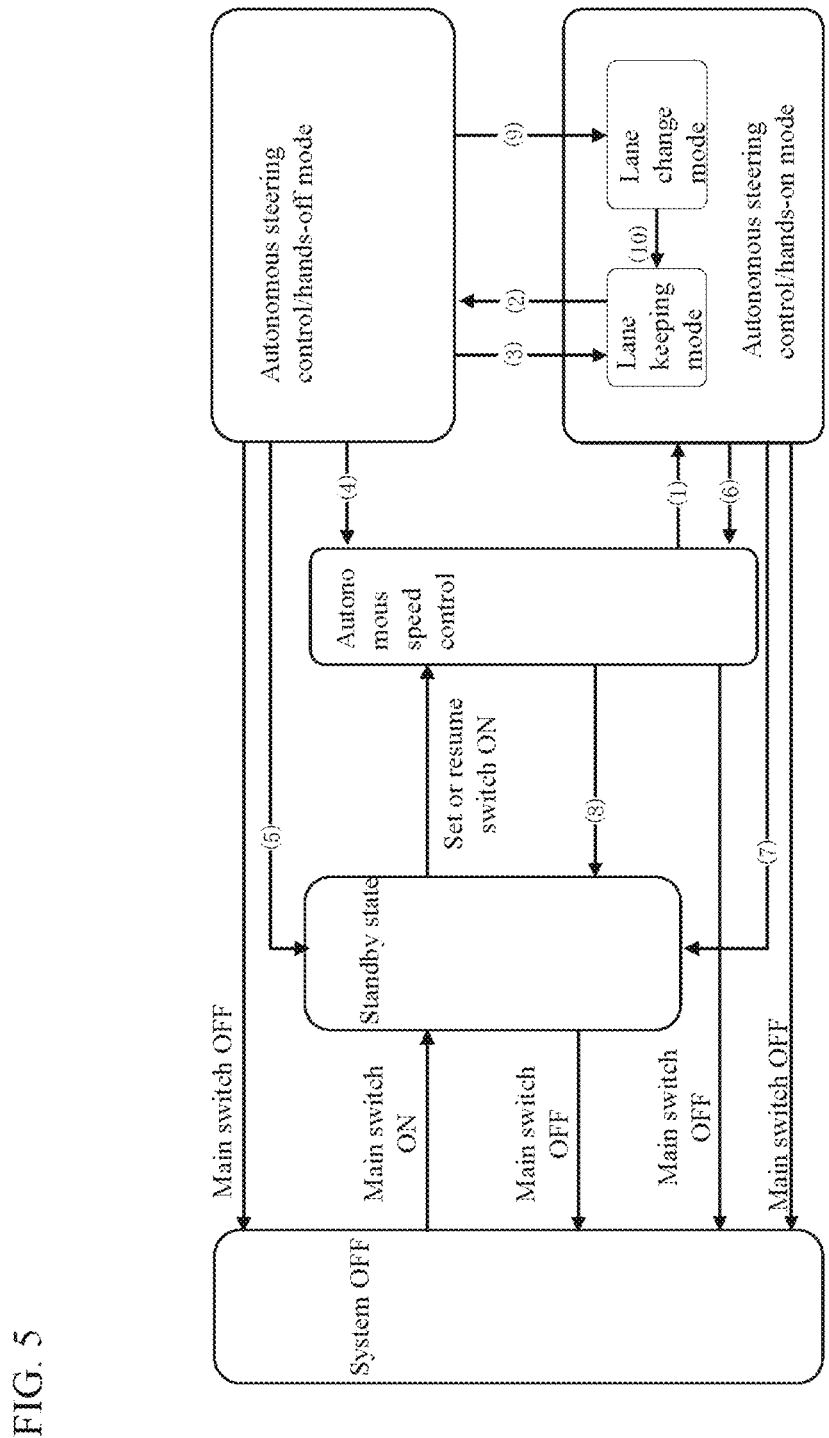
FIG. 5 is a block diagram illustrating a state transition of the control device of FIG. 1.

FIG. 5 is a block diagram illustrating a state transition of each function established in the control device 18. The system illustrated in the figure means an autonomous travel control system realized by the control device 18. When the main switch 161 of FIG. 2 is turned ON from the system OFF state illustrated in the figure, the system comes to a standby state. From this standby state, the autonomous speed control is activated by turning ON the set/coast switch 163 or resume/acceleration switch 162 of FIG. 2. This allows the above-described constant speed control or inter-vehicle distance control to be started, and the driver can drive the subject vehicle simply by operating the steering wheel without stepping on the accelerator or the brake.

During the execution of the autonomous speed control, when the condition (1) of FIG. 5 is satisfied, the mode transitions to the lane keeping mode of the autonomous steering control/hands-on mode. Examples of the condition (1) include, but are not limited to, a condition in which all of the following conditions are satisfied: lane markers on both sides of the subject vehicle are being detected; the driver is holding the steering wheel; the vehicle is traveling near the center of the lane; the blinkers are not operating; the windshield wiper is not operating at a high speed (HI); and when a high-precision map is provided, there is not a tollgate, an exit, a merging point, an intersection, or a point at which the number of lanes decreases, within about 200 m ahead. The hands-on mode refers to a mode in which the autonomous steering control does not operate unless the driver holds the steering wheel, while the hands-off mode refers to a mode in which the autonomous steering control operates even when the driver releases the steering wheel.

During the execution of the lane keeping mode of the autonomous steering control/hands-on mode, when the condition (2) of FIG. 5 is satisfied, the mode transitions to the lane keeping mode of the autonomous steering control/ hands-off mode. Examples of the condition (2) include, but are not limited to, a condition in which all of the following conditions are satisfied: the subject vehicle is traveling on an automobile road; the vehicle is traveling on a road that is structurally separated from the oncoming lane; the vehicle is traveling on a road for which a high-precision map is prepared; the vehicle is traveling at a speed not higher than the speed limit; GPS signals are effective; the driver is holding the steering wheel; the driver is facing forward; there is not a tollgate, an exit, a merging point, an intersection, or a point at which the number of lanes decreases, within about 800 m ahead; there is not a sharp curve of 100R or less within about 500 m ahead; the vehicle is not traveling in a tunnel that exceeds 500 m from the tunnel entrance; and the accelerator pedal is not depressed.

On the contrary, during the execution of the lane keeping mode of the autonomous steering control/hands-off mode, when the condition (3) of FIG. 5 is satisfied, the mode transitions to the lane keeping mode of the autonomous steering control/hands-on mode. Examples of the condition (3) include, but are not limited to, a condition in which any of the following conditions is satisfied: the subject vehicle is traveling on a road other than an automobile road; the vehicle is traveling in a two-way traffic section; the vehicle is traveling on a road for which no high-precision map is prepared; the vehicle is traveling at a speed higher than the speed limit; GPS signals can no longer be received; the driver does not face forward within 5 seconds after a forward gaze alarm is activated; the driver monitor camera can no longer detect the driver; there is any of a tollgate, an exit, a merging point, an intersection, or a point at which the number of lanes decreases, within about 800 m ahead; when traveling at a vehicle speed of less than about 40 km/h, there is a sharp curve of 100R or less within about 200 m ahead; when traveling at a vehicle speed of about 40 km/h or more, there is a sharp curve of 170R or less within about 200 m ahead; the vehicle is traveling in a tunnel that exceeds 500 m from the tunnel entrance; the driver has stepped on the accelerator pedal while holding the steering wheel; and an approaching alarm has operated.

During the execution of the lane keeping mode of the autonomous steering control/hands-off mode, when the condition (4) of FIG. 5 is satisfied, the autonomous steering control is stopped and transitions to the autonomous speed control. Examples of the condition (4) include, but are not limited to, a condition in which any of the following conditions is satisfied: lane markers on both sides of the subject vehicle are no longer detected for a certain period of time; the driver has operated the steering wheel; and the windshield wiper has operated at a high speed (HI). During the execution of the lane keeping mode of the autonomous steering control/hands-off mode, when the condition (5) of FIG. 5 is satisfied, the autonomous steering control and the autonomous speed control are stopped and transition to the standby state. Examples of the condition (5) include, but are not limited to, a condition in which any of the following conditions is satisfied: the driver has operated the brake; the driver has operated the cancel switch 164 of FIG. 2; one or more doors of the subject vehicle have opened; the driver's seat belt has been released; the seating sensor has detected that the driver is no longer on the driver's seat; the select lever has come to other than "D" or ""M"; the parking brake has been operated; the antiskid brake system of the vehicle has been turned OFF; the antiskid brake system has operated; the snow mode has been turned ON; the emergency brake has operated; the stop state continues for about 3 minutes after the vehicle has stopped due to the vehicle speed control; the front camera has detected poor visibility such as being unable to correctly recognize an object due to dirt, backlight, rain/fog, or the like; the front radar has detected shielding or radio disturbance; the front radar has detected an axis deviation; the side radar has detected shielding or radio disturbance; and the side radar has detected an axis deviation.

During the execution of the autonomous steering control/ hands-on mode, when the condition (6) of FIG. 5 is satisfied, the autonomous steering control is stopped and transitions to the autonomous speed control. Examples of the condition (6) include, but are not limited to, a condition in which any of the following conditions is satisfied: lane markers on both sides of the subject vehicle are no longer detected; the driver has operated the steering wheel; the driver has operated the blinkers; the windshield wiper has operated at a high speed (HI); the vehicle has come to a tollgate section when a high-precision map is prepared; and the front camera has detected poor visibility such as being unable to correctly recognize an object due to dirt, backlight, rain/fog, or the like. During the execution of the autonomous steering control/hands-on mode, when the condition (7) of FIG. 5 is satisfied, the autonomous steering control and the autonomous speed control are stopped and transition to the standby state. Examples of the condition (7) include, but are not limited to, a condition in which any of the following conditions is satisfied: the driver has operated the brake; the driver has operated the cancel switch 164 of FIG. 2; one or more doors of the subject vehicle have opened; the driver's seat belt has been released; the seating sensor has detected that the driver is no longer on the driver's seat; the select lever has come to other than "D" or ""M"; the parking brake has been operated; the antiskid brake system of the vehicle has been turned OFF; the antiskid brake system has operated; the snow mode has been turned ON; the emergency brake has operated; the stop state continues for about 3 minutes after the vehicle has stopped due to the vehicle speed control; the front radar has detected shielding or radio disturbance; and the front radar has detected an axis deviation.

During the execution of the autonomous speed control, when the condition (8) of FIG. 5 is satisfied, the control transitions to the standby state. Examples of the condition (8) include, but are not limited to, a condition in which any of the following conditions is satisfied: the driver has operated the brake; the driver has operated the cancel switch 164 of FIG. 2; one or more doors of the subject vehicle have opened; the driver's seat belt has been released; the seating sensor has detected that the driver is no longer on the driver's seat; the select lever has come to other than "D" or ""M"; the parking brake has been operated; the antiskid brake system of the vehicle has been turned OFF; the antiskid brake system has operated; the snow mode has been turned ON; the emergency brake has operated; the stop state continues for about 3 minutes after the vehicle has stopped due to the vehicle speed control; the front radar has detected shielding or radio disturbance; and the front radar has detected an axis deviation.

During the execution of the lane keeping mode of the autonomous steering control/hands-off mode, when the condition (9) of FIG. 5 is satisfied, the mode transitions to a lane change mode of the autonomous steering control/hands-on mode. Examples of the condition (9) include, but are not limited to, a condition in which any of the following conditions is satisfied: when the system has proposed a lane change, the driver has pressed the lane change assist switch 166 of FIG. 2; and the driver has operated the blinkers.

During the execution of the lane change mode of the autonomous steering control/hands-on mode, when the condition (10) of FIG. 5 is satisfied, the mode transitions to the lane keeping mode of the autonomous steering control/hands-on mode. Examples of the condition (10) include, but are not limited to, a condition in which any of the following conditions is satisfied: the speed limit has been exceeded before the start of a lane change performance (abbreviated as LCP, hereinafter); the driver has stepped on the accelerator pedal while holding the steering wheel before the start of the LCP; the LCP can no longer be started within 10 seconds after pressing the lane change assist switch 166 during the proposal of a lane change when there is a slow car ahead; the LCP can no longer be started and the vehicle has come too close to the branching point after pressing the lane change assist switch 166 during the proposal of a lane change to travel along the route; a lane change maneuver (abbreviated as LCM, hereinafter) can no longer be started within 5 seconds after the LCP has operated; the vehicle speed has fallen below about 50 km/h after starting the LCP and before starting the LCM; there is no longer a space in the adjacent lane required to change lanes after operating the LCP and before starting the LCM; the driver has performed a cancel operation before starting the LCM; lane markers can no longer be detected before starting the LCM; a determination has been made before starting the LCM that there is no adjacent lane in the direction of changing lanes or there will be no adjacent lane within a certain distance ahead; a determination has been made before starting the LCM that there is a curve with a radius of curvature of 250 m or less within a certain distance ahead; a determination has been made before starting the LCM that there is a section within a certain distance ahead in which the type of lane marking prohibits a lane change to the adjacent lane; the side radar has detected shielding or radio disturbance before starting the LCM; the side radar has detected an axis deviation before starting the LCM; a hands-on alarm has operated (this condition is established when any of the following conditions is satisfied: the driver does not hold the steering wheel within about 2 seconds after the LCP has operated; the driver does not hold the steering wheel within about 2 seconds after pressing the lane change assist switch 166 during the proposal of a lane change when there is a slow car ahead; and the driver does not hold the steering wheel within about 2 seconds after pressing the lane change assist switch 166 during the proposal of a lane change to travel along the route); the driver has turned off the blinkers; and the LCP has been completed.

The system is turned OFF when the main switch 161 is turned OFF in any of the autonomous steering control/hands-off mode, the autonomous steering control/hands-on mode, the autonomous speed control, and the standby state.

Figure 6A:
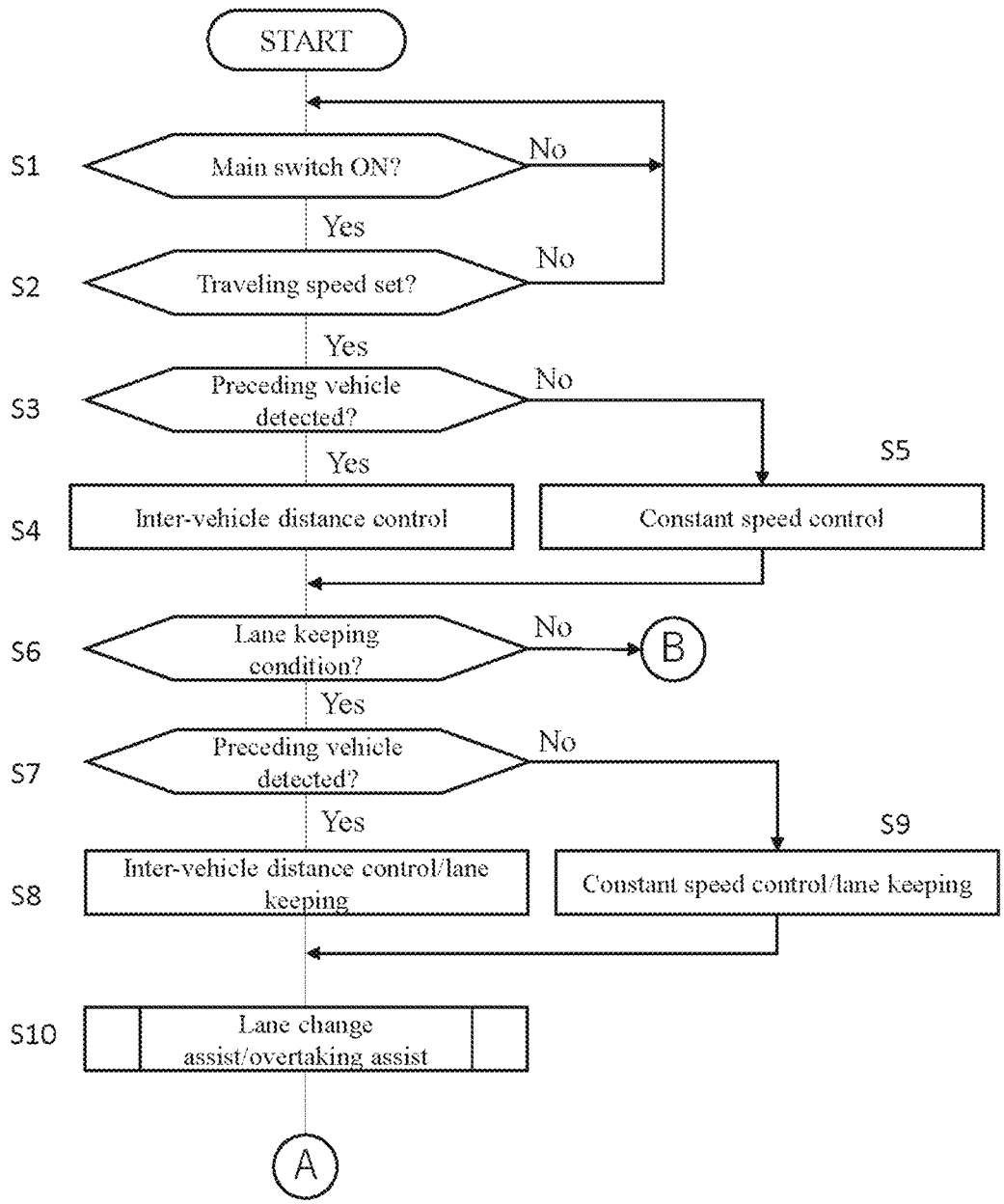
FIG. 6A is a flowchart (part 1) illustrating a travel control process of the travel control apparatus for a vehicle according to the present invention.
Figure 6C:
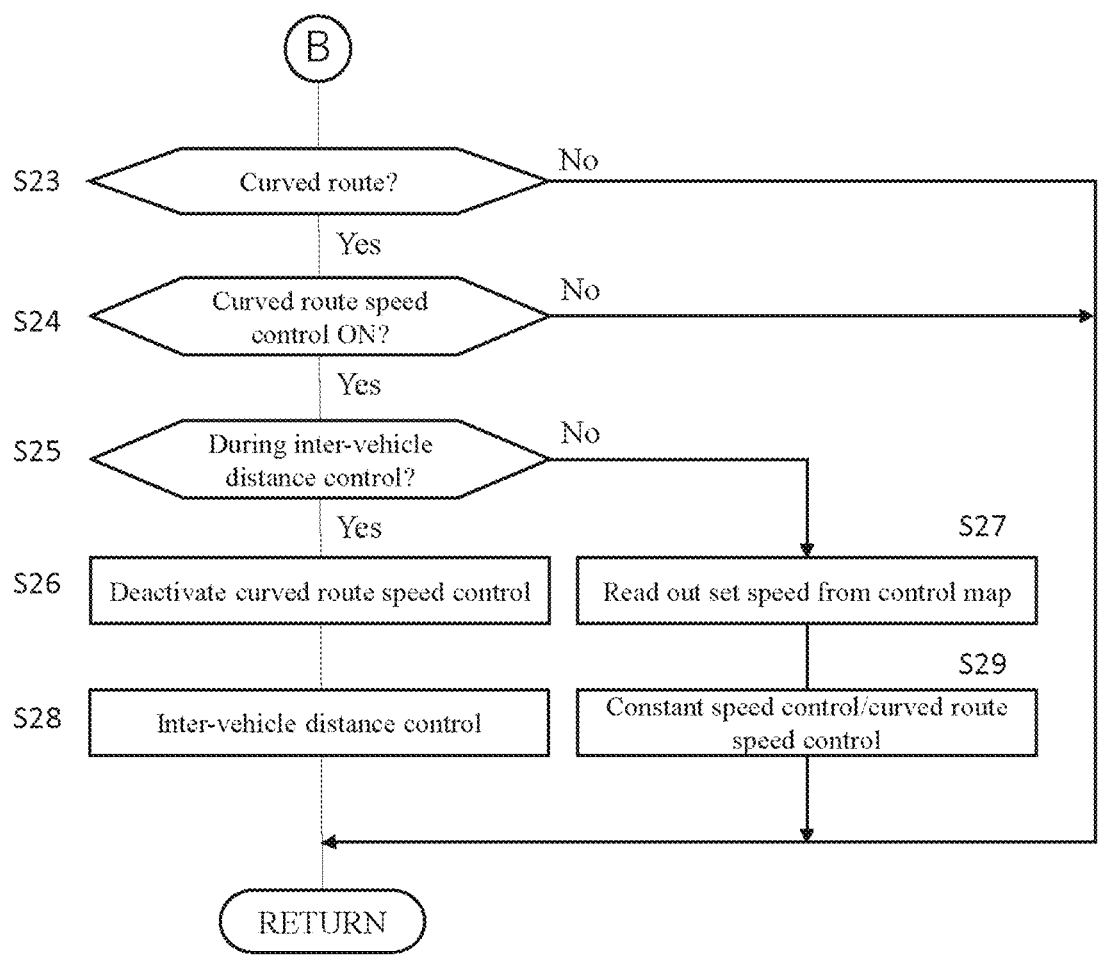
FIG. 6C is a flowchart (part 3) illustrating the travel control process of the travel control apparatus for a vehicle according to the present invention.

The travel control process according to the present embodiment will then be described with reference to FIGS. 6A to 6C. FIGS. 6A to 6C are flowcharts illustrating the travel control process according to the present embodiment. The control device 18 executes the travel control process, which will be described below, at predetermined time intervals. The following description will be made on the assumption that the control device 18 uses the autonomous travel control function to execute the autonomous speed control and the autonomous steering control and the subject vehicle travels along a curved route while the lane keeping control for controlling the traveling position of the subject vehicle in the width direction is performed so that the subject vehicle travels in the lane at a speed that is set by the driver.

First, in step S1 of FIG. 6A, a determination is made as to whether or not the main switch 161 of the control device 18 is ON, and when the main switch 161 is OFF, step S1 is repeated until the main switch 161 is turned ON. When the main switch 161 is ON, the process proceeds to step S2, in which a determination is made as to whether or not the traveling speed is set by the driver. When the traveling speed is not set, the process returns to step S1, from which steps S1 and S2 are repeated until the traveling speed is set. The setting of the traveling speed is performed by the driver operating the resume/acceleration switch 162 or set/coast switch 163 of the input device 16 illustrated in FIG. 2 to input a desired traveling speed.

When the traveling speed is set, the autonomous speed control is started. In step S3, the front radar (of the sensors 11) which detects an obstacle ahead of the subject vehicle is used to detect whether or not there is a preceding vehicle ahead of the subject vehicle in its travel lane, and when there is a preceding vehicle, the process proceeds to step S4, in which the inter-vehicle distance control is executed, while when there is no preceding vehicle, the process proceeds to step S5, in which the constant speed control is executed. This allows the driver to drive the subject vehicle at a desired speed simply by operating the steering wheel without stepping on the accelerator or the brake.

During the execution of the inter-vehicle distance control in step S4 or the constant speed control in step S5, a determination is made in step S6 as to whether or not the above-described condition (1) for transitioning to the lane keeping mode of the autonomous steering control/hands-on mode is satisfied. When the condition (1) is satisfied, the process proceeds to step S7, while when the condition (1) is not satisfied, the process proceeds to step S23 of FIG. 6C.

In step S7, the front radar (of the sensors 11) which detects an obstacle ahead of the subject vehicle is used to detect whether or not there is a preceding vehicle ahead of the subject vehicle in its travel lane. When there is a preceding vehicle, the process proceeds to step S8, in which the inter-vehicle distance control/lane keeping mode is executed, while when there is no preceding vehicle, the process proceeds to step S9, in which the constant speed control/lane keeping mode is executed. In this state, the execution process for the lane change assist function and/or overtaking assist function of step S10 is performed.

During the execution of the inter-vehicle distance control/lane keeping mode in step S8 or the constant speed control/lane keeping mode in step S9, a determination is made in the subsequent step S11 of FIG. 6B as to whether or not the above-described condition (2) for transitioning to the autonomous steering control/hands-off mode is satisfied. When the condition (2) is satisfied, the process proceeds to step S12, while when the condition (2) is not satisfied, the process proceeds to step S15. In step S12 in which the condition (2) for transitioning to the autonomous steering control/hands-off mode is satisfied, the front radar (of the sensors 11) which detects an obstacle ahead of the subject vehicle is used to detect whether or not there is a preceding vehicle ahead of the subject vehicle in its travel lane. When there is a preceding vehicle, the process proceeds to step S13, in which the inter-vehicle distance control/lane keeping mode/hands-off is executed, while when there is no preceding vehicle, the process proceeds to step S14, in which the constant speed control/lane keeping mode/hands-off is executed.

In step S15, a determination is made from the map database 13 as to whether or not there is a curve ahead of the subject vehicle on its route, and when there is a curved route, the size (such as the curvature or radius of curvature) of the curved route is acquired from the map database 13, and the process proceeds to step S16, while when there is no curved route, the process proceeds to step S20.

In step S16, the traveling speed corresponding to the size (curvature or radius of curvature) of the curve detected with reference to the control map illustrated in FIG. 4 is read out in order to execute the curved route speed control regardless of whether the setting of the curved route speed control function illustrated in FIG. 3 is ON or OFF. Then, in step S17, the front radar (of the sensors 11) which detects an obstacle ahead of the subject vehicle is used to detect whether or not there is a preceding vehicle ahead of the subject vehicle in its travel lane. When there is a preceding vehicle, the process proceeds to step S18, in which the inter-vehicle distance control/lane keeping mode/curved route speed control is executed, while when there is no preceding vehicle, the process proceeds to step S19, in which the constant speed control/lane keeping mode/curved route speed control is executed. Through this operation, when trying to travel along a sharp curve at high speed, it is possible to travel at a speed corresponding to the size of the curved route even with the setting of the curved route speed control function being OFF.

In step S20, the front radar (of the sensors 11) which detects an obstacle ahead of the subject vehicle is used to detect whether or not there is a preceding vehicle ahead of the subject vehicle in its travel lane. When there is a preceding vehicle, the process proceeds to step S21, in which a determination is made as in step S6 as to whether or not the condition (1) for transitioning to the lane keeping mode of the autonomous steering control/hands-on mode is satisfied, and when the condition (1) is satisfied, the process proceeds to step S22. In step S22, a determination is made as in step S11 as to whether or not the condition (2) for transitioning to the autonomous steering control/hands-off mode is satisfied, and when the condition (2) is satisfied, the process returns to step S12, from which the subsequent processes are continued. On the other hand, when there is no preceding vehicle and neither the condition (1) nor (2) is satisfied, the process returns to step S1, from which the subsequent processes are continued.

Referring again to step S6 of FIG. 6A, when the condition (1) for transitioning to the lane keeping mode of the autonomous steering control/hands-on mode is not satisfied, the process proceeds to step S23 of FIG. 6C. In step S23, a determination is made from the map database 13 as to whether or not there is a curve ahead of the subject vehicle on its route, and when there is a curved route, the size (such as the curvature or radius of curvature) of the curved route is acquired from the map database 13, and the process proceeds to step S24, while when there is no curved route, the process returns to step S1.

In step S24, a determination is made as to whether or not the setting of the curved route speed control function illustrated in FIG. 3 is ON, and when it is ON (enabled), the process proceeds to step S25, while when it is OFF (disabled), the process returns to step S1. In step S25, a determination is made as to whether or not the current travel control is the inter-vehicle distance control of the autonomous speed control function, and when it is the inter-vehicle distance control, the process proceeds to step S26, while when it is not the inter-vehicle distance control (when it is not the autonomous speed control or it is the constant speed control), the process proceeds to step S27.

In step S26, the driver's steering wheel operation is performed without the autonomous steering control function working (S6), there is a curved route ahead of the subject vehicle (S23), the curved route speed control function is set to ON (S24), and the inter-vehicle distance control is in progress (S25); therefore, the curved route speed control function set to ON is deactivated, that is, disabled, and only the inter-vehicle distance control is continued in step S28. This allows the subject vehicle to be steered by the driver's steering wheel operation, and the speed control is performed to autonomously travel while following the preceding vehicle, which travels just ahead of the vehicle, so as to maintain the set inter-vehicle distance. This is because the vehicle is following the preceding vehicle in accordance with the driver's steering wheel operation, so it is possible to turn the curve without anxiety or uncomfortable feeling even when the curved route speed control function is not activated to decrease the speed. Moreover, when turning the curved route, the curved route speed control function is not activated, and unnecessary deceleration can therefore be suppressed.

On the other hand, in step S27, the driver's steering wheel operation is performed without the autonomous steering control function working (S6), there is a curved route ahead of the subject vehicle (S23), the curved route speed control function is set to ON (S24), and the inter-vehicle distance control is not in progress (S25); therefore, the curved route speed control function set to ON is activated, that is, enabled in accordance with the setting, and the constant speed control/curved route speed control is executed in step S29. This allows the subject vehicle to be steered by the driver's steering wheel operation, while the speed control is performed to autonomously travel at a speed corresponding to the size of the curve that is set in the control map.

As described above, according to the travel control apparatus 1 and travel control method for a vehicle of the present embodiments, when the autonomous speed control function and the autonomous steering control function are set to ON, the curved route speed control function is operated regardless of whether the curved route speed control function is set to ON or OFF, and it is therefore possible to set the traveling vehicle speed along a curved route by a simple determination process without involving a complicated determination process.

Moreover, according to the travel control apparatus 1 and travel control method for a vehicle of the present embodiments, provided that the autonomous speed control function is set to ON, the autonomous steering control function is set to OFF, and the curved route speed control function is set to ON, when the inter-vehicle distance control function is used for traveling to follow a preceding vehicle, the curved route speed control function is not operated, and it is therefore possible to suppress unnecessary deceleration.

Furthermore, according to the travel control apparatus 1 and travel control method for a vehicle of the present embodiments, when the traveling speed set by the driver exceeds the set speed extracted from the control map, the traveling speed of the vehicle is controlled with an upper limit of the set speed extracted from the control map, and it is therefore possible to suppress the occurrence of a situation in which the autonomous traveling may have to be suspended due to uncompleted turn of a curve.

DESCRIPTION OF REFERENCE NUMERALS

1 Travel control apparatus
11 Sensors
12 Subject vehicle position detection device
13 Map database
14 Onboard equipment
15 Presentation device
16 Input device
161 Main switch
162 Resume/acceleration switch
163 Set/coast switch
164 Cancel switch
165 Inter-vehicle distance adjustment switch
166 Lane change assist switch
167 Display screen
168 ON button
169 OFF button
17 Drive control device
18 Control device

The invention claimed is:

1. A travel control method for a vehicle by using the vehicle to autonomously control a travel of the vehicle,
the vehicle having an autonomous speed control function for autonomously controlling a traveling speed of the vehicle and an autonomous steering control function for autonomously controlling steering of the vehicle,
the autonomous speed control function including a curved route speed control function for controlling the traveling speed of the vehicle at a set speed corresponding to a size of a curve of a travel route, the curved route speed control function capable of being set to ON/OFF,
each of the autonomous speed control function and the autonomous steering control function capable of being set to ON/OFF,
wherein when the autonomous speed control function and the autonomous steering control function are set to ON, the curved route speed control function is operated regardless of whether the curved route speed control function is set to ON or OFF.

2. The travel control method for a vehicle according to claim 1, wherein
the autonomous speed control function includes an inter-vehicle distance control function used, when detecting a preceding vehicle, for traveling to follow the preceding vehicle so as to maintain an inter-vehicle distance to the preceding vehicle with an upper limit of the traveling speed that is set by a driver, and
provided that the autonomous speed control function is set to ON, the autonomous steering control function is set to OFF, and the curved route speed control function is set to ON, when the inter-vehicle distance control function is used for traveling to follow the preceding vehicle, the curved route speed control function is not operated.

3. The travel control method for a vehicle according to claim 1, wherein
the curved route speed control function is executed using a control map in which the traveling speed corresponding to the size of the curve of the travel route is preliminarily set, and
when the traveling speed set by a driver exceeds the set speed extracted from the control map, the traveling speed of the vehicle is controlled with an upper limit of the set speed extracted from the control map.

4. The travel control method for a vehicle according to claim 1, wherein the size of the curve of the travel route is detected from map data that is preliminarily stored.

5. The travel control method for a vehicle according to claim 1, wherein
the autonomous speed control function includes:
an inter-vehicle distance control function used, when detecting a preceding vehicle, for traveling to follow the preceding vehicle so as to maintain an inter-vehicle distance to the preceding vehicle with an upper limit of the traveling speed that is set by a driver; and
a constant speed control function used, when detecting no preceding vehicle, for performing constant speed traveling at the traveling speed set by the driver, and
the autonomous steering control function is operated when the autonomous speed control function is operated, at least lane markers of a travel route are detected, and the vehicle is traveling at a certain position in a travel lane.

6. The travel control method for a vehicle according to claim 1, wherein
the autonomous steering control function includes a hands-on mode that does not operate unless a driver holds a steering wheel and a hands-off mode that operates even when the driver releases the steering wheel, and
the hands-off mode transitions from the hands-on mode when a predetermined travel condition is satisfied in a state of the hands-on mode.

7. A travel control apparatus for a vehicle, configured to autonomously control a travel of the vehicle,
the travel control apparatus having an autonomous speed control function for autonomously controlling a traveling speed of the vehicle and an autonomous steering control function for autonomously controlling steering of the vehicle,
the autonomous speed control function including a curved route speed control function for controlling the traveling speed of the vehicle at a set speed corresponding to a radius of curvature of a travel route, the curved route speed control function capable of being set to ON/OFF,
each of the autonomous speed control function and the autonomous steering control function capable of being set to ON/OFF, wherein when the autonomous speed control function and the autonomous steering control function are set to ON, the curved route speed control function is operated regardless of whether the curved route speed control function is set to ON or OFF.

\* \* \* \* \*